US011354207B2

(12) United States Patent
Rosenberg (10) Patent No.: US 11,354,207 B2
(45) Date of Patent: Jun. 7, 2022

(54) LIVE PROCESS MIGRATION IN RESPONSE TO REAL-TIME PERFORMANCE-BASED METRICS

(71) Applicant: Red Hat, Inc., Raleigh, NC (US)

(72) Inventor: Steven E. Rosenberg, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 3 days.

(21) Appl. No.: 16/822,953

(22) Filed: Mar. 18, 2020

(65) Prior Publication Data

US 2021/0294704 A1    Sep. 23, 2021

(51) Int. Cl.
*G06F 11/00* (2006.01)
*G06F 11/20* (2006.01)
*G06F 11/34* (2006.01)
*G06F 11/30* (2006.01)

(52) U.S. Cl.
CPC ........ *G06F 11/203* (2013.01); *G06F 11/3024* (2013.01); *G06F 11/3495* (2013.01); *G06F 2201/805* (2013.01)

(58) Field of Classification Search
CPC .. G06F 11/076; G06F 11/203; G06F 11/3024; G06F 11/3495
See application file for complete search history.

(56) References Cited

U.S. PATENT DOCUMENTS

| | | | |
|---|---|---|---|
| 8,244,957 B2 * | 8/2012 | Eidus | G06F 9/5033 711/6 |
| 8,312,318 B2 | 11/2012 | Graham et al. | |
| 8,873,375 B2 | 10/2014 | Kim et al. | |
| 8,966,216 B1 * | 2/2015 | Marshak | G06F 3/0619 711/170 |
| 9,448,904 B2 * | 9/2016 | Ishida | G06F 11/3055 |
| 9,621,421 B1 * | 4/2017 | Tolentino | H04L 43/16 |
| 9,626,272 B2 | 4/2017 | Heilper et al. | |
| 9,712,503 B1 | 7/2017 | Ahmed et al. | |
| 10,067,803 B2 * | 9/2018 | Cropper | G06F 9/4843 |
| 10,146,594 B2 | 12/2018 | Chao et al. | |

(Continued)

FOREIGN PATENT DOCUMENTS

| | | |
|---|---|---|
| CN | 103827823 A | 5/2014 |
| CN | 103907092 A | 7/2014 |

(Continued)

OTHER PUBLICATIONS

Amin, Zeeshan, et al., "Review on Fault Tolerance Techniques in Cloud Computing," International Journal of Computer Applications, vol. 116, Issue 18, Apr. 2015, pp. 11-17.

(Continued)

*Primary Examiner* — Elmira Mehrmanesh
(74) *Attorney, Agent, or Firm* — Withrow & Terranova, PLLC (57) ABSTRACT

Live process migration in response to real-time performance-based metrics is disclosed. At least one performance metric value that quantifies a performance metric of a first computing device is obtained. It is determined that the at least one performance metric value has an undesirable value. The initiation of a live migration of a process executing on the first computing device to a second computing device is caused based on determining that the at least one performance metric value has the undesirable value.

18 Claims, 7 Drawing Sheets

(56) References Cited

U.S. PATENT DOCUMENTS

| | | | |
|---|---|---|---|
| 10,333,827 B2 | 6/2019 | Xu et al. | |
| 10,339,016 B2 | 7/2019 | Juniwal et al. | |
| 10,375,169 B1 | 8/2019 | Diallo et al. | |
| 10,684,909 B1 | 6/2020 | August et al. | |
| 2008/0196026 A1 | 8/2008 | Azagury et al. | |
| 2010/0332889 A1 | 12/2010 | Shneorson et al. | |
| 2011/0153798 A1 | 6/2011 | Groenendaal et al. | |
| 2011/0320556 A1 | 12/2011 | Reuther | |
| 2013/0238786 A1 | 9/2013 | Khesin | |
| 2014/0130044 A1 | 5/2014 | Zhang et al. | |
| 2014/0195484 A1 | 7/2014 | Wang et al. | |
| 2014/0201533 A1 | 7/2014 | Kruglick | |
| 2015/0220356 A1 | 8/2015 | Khesin | |
| 2016/0188378 A1 | 6/2016 | Chao et al. | |
| 2016/0323098 A1 | 11/2016 | Bathen | |
| 2017/0315838 A1* | 11/2017 | Nidugala | H04L 67/1095 |
| 2018/0032997 A1 | 2/2018 | Gordon et al. | |
| 2018/0053001 A1 | 2/2018 | Folco et al. | |
| 2018/0189087 A1 | 7/2018 | Palermo et al. | |
| 2018/0246751 A1 | 8/2018 | Dong et al. | |
| 2018/0373553 A1 | 12/2018 | Connor et al. | |
| 2019/0087215 A1 | 3/2019 | Bhandari et al. | |
| 2019/0109901 A1* | 4/2019 | Zheng | H04L 41/142 |
| 2019/0215332 A1 | 7/2019 | Kaplan et al. | |
| 2019/0361746 A1* | 11/2019 | Schardt | G06F 9/5027 |
| 2020/0034221 A1* | 1/2020 | Ganesan | G06F 11/0709 |
| 2021/0019134 A1* | 1/2021 | Rusev | H04L 43/0817 |
| 2021/0049031 A1 | 2/2021 | Halcrow et al. | |

FOREIGN PATENT DOCUMENTS

| | | |
|---|---|---|
| CN | 107247651 A | 10/2017 |
| CN | 109101322 A | 12/2018 |
| CN | 104683388 B | 2/2019 |
| CN | 109783192 A | 5/2019 |
| CN | 110162379 A | 8/2019 |
| EP | 2782009 A1 | 9/2014 |
| JP | 2015156150 A | 8/2015 |
| JP | 2015156585 A | 8/2015 |
| KR | 101856543 B1 | 5/2018 |

OTHER PUBLICATIONS

Chandrakala, B. et al., "Migration of Virtual Machine to improve the Security in Cloud Computing," International Journal of Electrical and Computer Engineering (IJECE), vol. 8, No. 1, Feb. 2018, Institute of Advanced Engineering and Science, pp. 210-219.

Engelmann, C., et al., "Proactive Fault Tolerance Using Preemptive Migration," International Conference on Parallel, Distributed and Network-based Processing, Feb. 2009, Weimar, Germany, IEEE, 6 pages.

Kochhar, Deepak, et al., "An Approach for Fault Tolerance in Cloud Computing Using Machine Learning Technique," International Journal of Pure and Applied Mathematics, vol. 117, Issue 22, 2017, pp. 345-351.

Ye, Kejiang, et al., "Fault Injection and Detection for Artificial Intelligence Applications in Container-Based Clouds," Nature, 2018, Springer International Publishing, pp. 112-127.

Notice of Allowance and Examiner-Initiated Interview Summary for U.S. Appl. No. 16/693,519, dated Apr. 7, 2022, 14 pages.

* cited by examiner

LIVE PROCESS MIGRATION IN RESPONSE TO REAL-TIME PERFORMANCE-BASED METRICS

BACKGROUND

A host computing device failure leads to service disruption and dissatisfied customers. Although a service provider may be able to re-initiate the service on another host computing device, it takes time to identify another host computing device, configure the host computing device with the requirements needed by the service, and reinitialize the service, resulting in dissatisfaction among the users of the service.

SUMMARY

The examples disclosed herein continually monitor performance metrics of a plurality of computing devices, and, based on performance metric criteria, initiate live migration of processes from a source computing host that is deemed to be degraded, to a target computing host. Among other advantages, the examples thus eliminate or greatly reduce service disruptions.

In one example a method is provided. The method includes obtaining, by a processor device, at least one performance metric value that quantifies a performance metric of a first computing device. The method further includes determining, by the processor device, that the at least one performance metric value has an undesirable value. The method further includes causing initiation of a live migration of a process executing on the first computing device to a second computing device based on determining that the at least one performance metric value has the undesirable value.

In another example a computing device is provided. The computing device includes a memory and a processor device coupled to the memory. The processor device is to obtain at least one performance metric value that quantifies a performance metric of a first computing device. The processor device is further to determine that the at least one performance metric value has an undesirable value, and cause initiation of a live migration of a process executing on the first computing device to a second computing device based on determining that the at least one performance metric value has the undesirable value.

In another example a computer program product is provided. The computer program product is stored on a non-transitory computer-readable storage medium and includes instructions to cause a processor device to obtain at least one performance metric value that quantifies a performance metric of a first computing device. The instructions further cause the processor device to determine that the at least one performance metric value has an undesirable value, and cause initiation of a live migration of a process executing on the first computing device to a second computing device based on determining that the at least one performance metric value has the undesirable value.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Computing environments today may include hundreds or thousands of host computing devices that implement thousands and thousands of different computing processes, each of which provides a service for some entity. It is inevitable that over time, host computing devices develop problems that may result in an immediate shutdown, such as when a memory chip goes bad or a processor device overheats and goes into a protective mode, or the problems may lead to degradation of service, such as when a host computing device is overloaded or when a computing device component is suffering problems that are not yet severe enough to completely halt the component but that result in compromised performance.

Once it is determined that a computing host cannot provide sufficient service, either because it has faulted or is degraded, the processes that provided services on the degraded computing host are initiated on another computing host. This process can involve a number of tasks, such as, by way of non-limiting example, identifying a suitable target computing host, moving data from the degraded computing host to the target computing host, and initiating the appropriate processes. In situations where the processes were providing real-time services to users, this may lead to a disruption in service and user dissatisfaction.

The examples disclosed herein continually monitor performance metrics of a plurality of computing devices, and, based on performance metric criteria, initiate live migration of processes from a source computing host that is deemed to be degraded, to a target computing host. The examples thus eliminate or greatly reduce service disruption.

Figure 1:
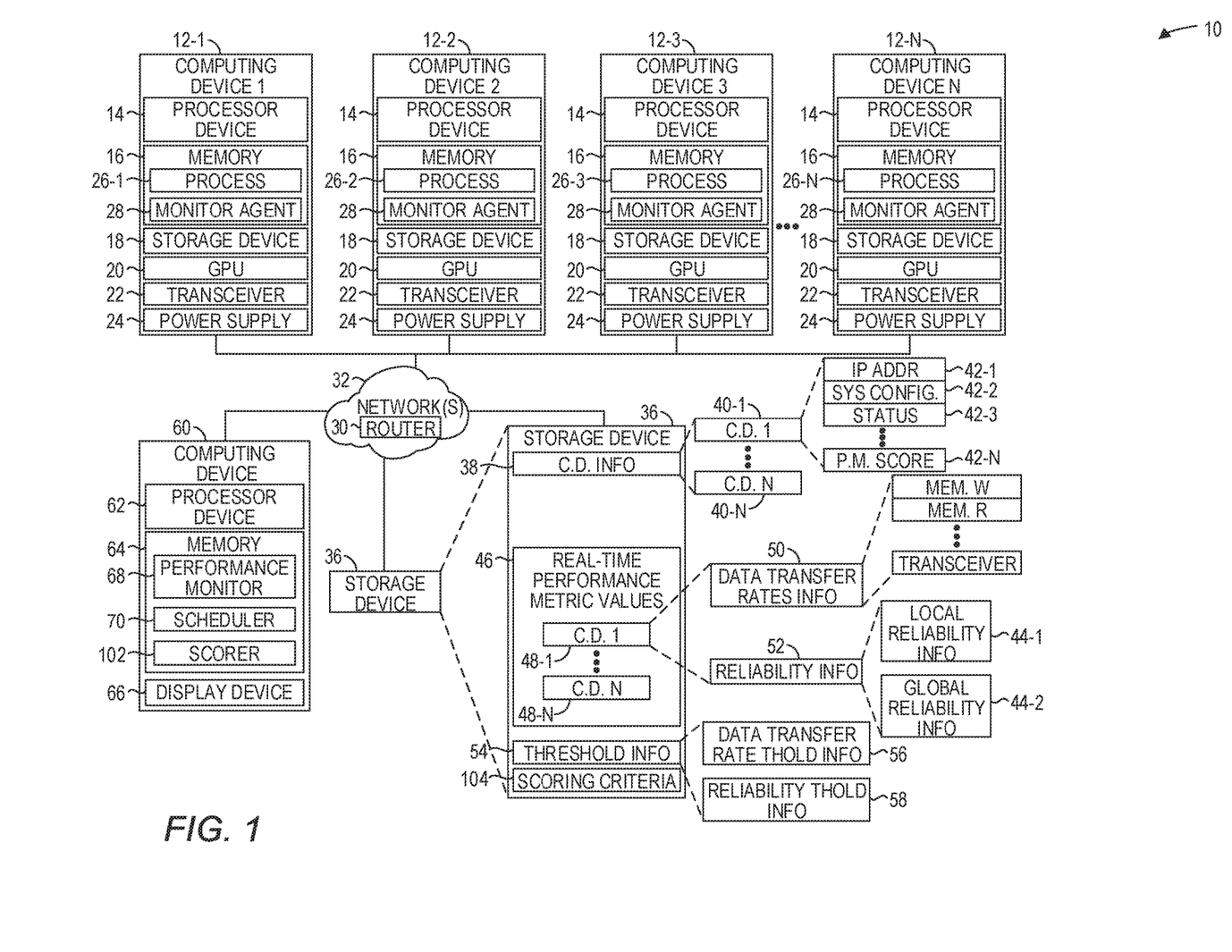
FIG. 1 is a block diagram of a system suitable for implementing process migration in response to real-time performance-based metrics according to one implementation.

FIG. 1 is a block diagram of a system 10 in which examples disclosed herein may be practiced. The system 10 includes a plurality of computing devices 12-1-12-N (generally, computing devices 12) that constitute a pool of computing devices 12 that provide services to one or more entities. There may be tens, hundreds or thousands of computing devices 12 in the system 10. In some implementations, the pool of computing devices 12 may be part of a cloud computing environment, either a private cloud computing environment or a third-party cloud computing environment that provides on-demand data processing series to different tenants (e.g., different customers).

The computing device 12-1 may include a number of electronic components, including, by way of non-limiting example, a processor device 14, a memory 16, a storage device 18, a graphics processing unit (GPU) 20, a transceiver 22 configured to communicate with a network, and a power supply 24. The computing device 12-1 also includes one or more processes 26 that provide services to some entity. The processes 26 may be any process. In some implementations, the processes 26 are virtual machines implemented through a virtualization technology, such as, by way of non-limiting example, VMware® virtualization technology or Kernel-based Virtual Machine (KVM) virtualization technology. Each of the computing devices 12-2-12-N may have similar electronic components 14, 16, 18, 20, 22, and 24 as described above with regard to the computing device 12-1. Solely for the purposes of illustration, the computing device 12-1 is illustrated as having a single process 26-1, and each of the computing devices 12-2-12-N may also have corresponding processes 26-2-26-N executing thereon. The processes 26-1-26-N may have identical functionality to one another, or completely different functionality. It will be appreciated that solely for purposes of illustration the computing devices 12 are illustrated as having a single process 26, but in actual practice, tens, hundreds or even thousands of processes may be concurrently executing on a single computing device 12.

The computing device 12-1 includes a monitor agent 28 that is configured to continuously obtain performance metric values that quantify corresponding performance metrics of the computing device 12-1. The monitor agent 28 may be a separate process or integrated into other processes of the computing device 12-1, such as an operating system of the computing device 12-1 or a virtual machine monitor of the computing device 12-1.

The monitor agent 28 may obtain such performance metric values by directly taking a suitable measurement, by obtaining the performance metric value from another process that takes such measurements, and/or by detecting certain events, such as faults. The measurements may be taken at any desired interval. The interval may differ depending on the particular performance metric being measured. Such intervals may be, by way of non-limiting example, in milliseconds, in seconds, in minutes, or any other suitable interval.

The performance metrics, in some implementations, include data transfer rates of data communicated between electronic components. As an example, the monitor agent 28 may continuously measure a data transfer rate of data communicated between the processor device 14 and the memory 16. Additional non-limiting examples of suitable data transfer rates may be a data transfer rate of data communicated between the transceiver 22 and a router or switch 30 in a network 32; a data transfer rate of data communicated between the processor device 14 and the storage device 18; a data transfer rate of data communicated between the processor device 14 and the GPU 20; and a data transfer rate of data communicated between the GPU 20 and the memory 16.

The monitor agent 28 continuously stores, or causes to be stored, the obtained data transfer rates in a central storage device 36 for subsequent analysis, as described in greater detail below. The monitor agent 28 may send the obtained data transfer rates at the same interval they are obtained, or some other interval.

The performance metrics, in some implementations, may also be based on detected faults of the electronic components and/or software components that execute on the computing device 12-1, including, by way of non-limiting example, the operating system, drivers, libraries, or other processes. The detected faults may vary depending on the particular electronic component but may include, by way of non-limiting example, memory faults of the memory 16, transceiver faults of the transceiver 22, power supply spikes or drops of the power supply 24, and read and write errors of the storage device 18. The performance metrics, in some implementations, may also be based on the age of the electronic components, and/or a global failure rate of similar electronic components in an overall population of the computing devices 12. The performance metrics, in some implementations, may also be based, by way of non-limiting example, on sensed characteristics of the components, such as temperature of components, internal temperature of a chassis, external temperature of the chassis, electromagnetic radiation emissions, fan speed and the like, and on variations between current sensed characteristics and historical sensed characteristics of either the same component, or that of a population of identical components. The monitor agent 28 continuously stores, or causes to be stored, the information that identifies the detected faults in the storage device 36, in which the obtained data transfer rates are stored for subsequent analysis, as described in greater detail below.

Each of the computing devices 12-2-12-N is configured similarly as described above with regard to the computing device 12-1. Each of the computing devices 12-2-12-N also include a monitor agent 28 that continuously obtains the real-time performance metrics, as described above with regard for the computing device 12-1, for the corresponding computing device 12-2-12-N on which the respective monitor agent 28 executes. Each monitor agent 28 stores, or causes to be stored, the real-time performance metrics in the storage device 36.

The storage device 36 includes computing device (C.D.) information 38 associated with the computing devices 12. The computing device information 38 may include a plurality of records 40-1-40-N (generally, records 40), each of which corresponds to a respective computing device 12-1-12-N. Each record 40 may include, for example, an IP address 42-1 of the corresponding computing device 12; a system configuration 42-2 of the corresponding computing device 12 that identifies, for example, the amount of memory, the number of processors, the type of operating system, and any other suitable characteristics of the corresponding computing device 12; and a status 42-3 that identifies a current status of the corresponding computing device 12, such as active, inactive, or the like. In some implementations, each record 40 may include a performance metric (P.M.) score 42-N, which, as will be discussed in greater detail below, may be generated based on the real-time performance metrics that correspond to the respective computing device 12.

The storage device 36 also includes real-time performance metric values 46 for each computing device 12-1-12-N, which comprises the real-time performance metrics received from the monitor agents 28. In one implementation, the real-time performance metric values 46 include a plurality of records 48-1-48-N (generally, records 48), each of which corresponds to a respective computing device 12-1-12-N. Each record 48 includes data transfer rates information 50 and reliability information 52. The data transfer rates information 50 contains the data transfer rates of data communicated between electronic components of the corresponding computing device 12 received from the corresponding monitor agent 28, as discussed above. As an example, the data transfer rates information 50 of the record 48-1 corresponds to the computing device 12-1, and may include a data transfer rate of data communicated between the processor device 14 and the memory 16, a data transfer rate of data communicated between the transceiver 22 and a router or switch 30 in the network 32, a data transfer rate of data communicated between the processor device 14 and the storage device 18, a data transfer rate of data communicated between the processor device 14 and the GPU 20, a data transfer rate of data communicated between the GPU 20 and the memory 16, and the like.

The reliability information 52 includes local reliability information 44-1 and global reliability information 44-2. The local reliability information 44-1 contains the information that identifies the detected faults of the electronic components of the corresponding computing device 12 received from the corresponding monitor agent 28, and as discussed above, such information may comprise, for example, an age of the electronic component, detected faults of software components, sensed characteristics of the components, such as thermal temperature, electromagnetic fields, fan speed and the like.

As an example, the reliability information 52 of the record 48-1 corresponds to the computing device 12-1, and may include, by way of non-limiting example, an age of each electronic component, memory faults of the memory 16, transceiver faults of the transceiver 22, power supply spikes or drops of the power supply 24, read and write errors of the storage device 18, a current temperature of the processor device 14 of the computing device 12-1, historical temperatures of the processor device 14 of the computing device 12-1, detected faults of software processes executing on the computing device 12-1, information for each electronic component related to expected life-span of the respective electronic component given failures of identical components in other computing devices 12, and the like.

The storage device 36 also includes threshold information 54 that identifies thresholds, in terms of numbers, ranges of numbers, or other information that, as described in greater detail below, may be used to determine whether a live migration of a process 26 from one computing device 12 to another computing device 12 should be scheduled or initiated based on the data transfer rates information 50 stored in the records 48. The threshold information 54 may include, by way of non-limiting example, data transfer rate threshold information 56 that identifies suitable, or unsuitable, data transfer rates of data communicated between electronic components of the computing devices 12. The threshold information 54 may also include reliability threshold information 58 that identifies thresholds, in terms of numbers, ranges of numbers, or other information that, as described in greater detail below, is used to determine whether a live migration of a process 26 from one computing device 12 to another computing device 12 should be scheduled or initiated based on the reliability information 52 stored in the records 48. In some implementations, the initiation of a live migration may be in response to a single performance metric value 46. In other implementations, the initiation of a live migration may be in response to a score that involves a plurality of the performance metric values 46.

The system 10 also includes a computing device 60, which in turn includes a processor device 62 communicatively coupled to a memory 64, and a display device 66. A performance monitor 68 executes in the memory 64. The performance monitor 68 periodically accesses the storage device 36 to obtain the real-time performance metric values 46 of the computing devices 12. The performance monitor 68 may obtain the real-time performance metric values 46 at any desired interval, such as every second, every minute or any other desired interval. The performance monitor 68 analyzes the real-time performance metric values 46, which includes the data transfer rate information 50 and the reliability information 52, in conjunction with the threshold information 54 to determine whether any of the real-time performance metric values 46 have undesirable values. If the performance monitor 68 determines that one or more of the real-time performance metric values 46 have undesirable values, the performance monitor 68 may initiate a live migration of a process 26 executing on the computing device 12 from which the real-time performance metric values 46 were obtained, to another computing device 12.

In some implementations, the performance monitor 68 includes a scorer 102. The scorer 102 evaluates one or more of the performance metric values 46 for each computing device 12 and, based on the performance metric values 46 and scoring criteria 104, establishes a score for the respective computing device 12. The scoring criteria 104 are based on what constitutes undesirable performance metric values for the respective performance metric value.

The performance monitor 68 may, if the score for a respective computing device 12 exceeds a particular value, initiate a live migration of one or more processes executing on the respective computing device 12 to another computing device 12. In some implementations the decision to initiate a live migration may be based on a ranking of the score of a computing device 12 with respect to all the other computing devices 12. For example, if a score of a computing device 12 falls into a $20^{th}$ percentile or below of all scores, the performance monitor 68 may initiate a live migration of one or more processes executing on the respective computing device 12 to another computing device 12. The performance monitor 68 may also select a target computing device 12 from the pool of computing devices 12 based on the performance metric score of the target computing device 12. The decision may be based on an absolute value, or based on a ranking of the score with respect to all the other computing devices 12. For example, the performance monitor 68 may select as a target computing device 12 a computing device 12 that has a ranking in the 75$^{th}$ percentile, or above.

The term "live migration", as used herein, refers to the copying of relevant portions of one or more processes 26 from a source computing device 12 to a target computing device 12 while the one or more processes 26 continue to execute on the source computing device 12. The relevant portions of the one or more processes 26 may include, by way of non-limiting example, the portions of the memory 16 used by the one or more processes 26 and any data stored on a storage device 18 that is used by the one or more processes 26. After the relevant portions of the one or more processes 26 have been copied to the target computing device 12, the one or more processes 26 on the source computing device 12 may be briefly paused; any memory and/or data that was altered since the beginning of the live migration process may then be copied to the target computing device 12; and the one or more processes 26 may be reinitiated on the target computing device 12.

In some examples, the performance monitor 68 may initiate a live migration of a process 26 in conjunction with a scheduler 70. In particular, the performance monitor 68 may send a message to the scheduler 70 identifying the source computing device 12 and the target computing device 12. The scheduler 70 then determines the soonest time a live migration of the process 26 from the source computing device 12 to the target computing device 12 can be initiated.

Figure 2:
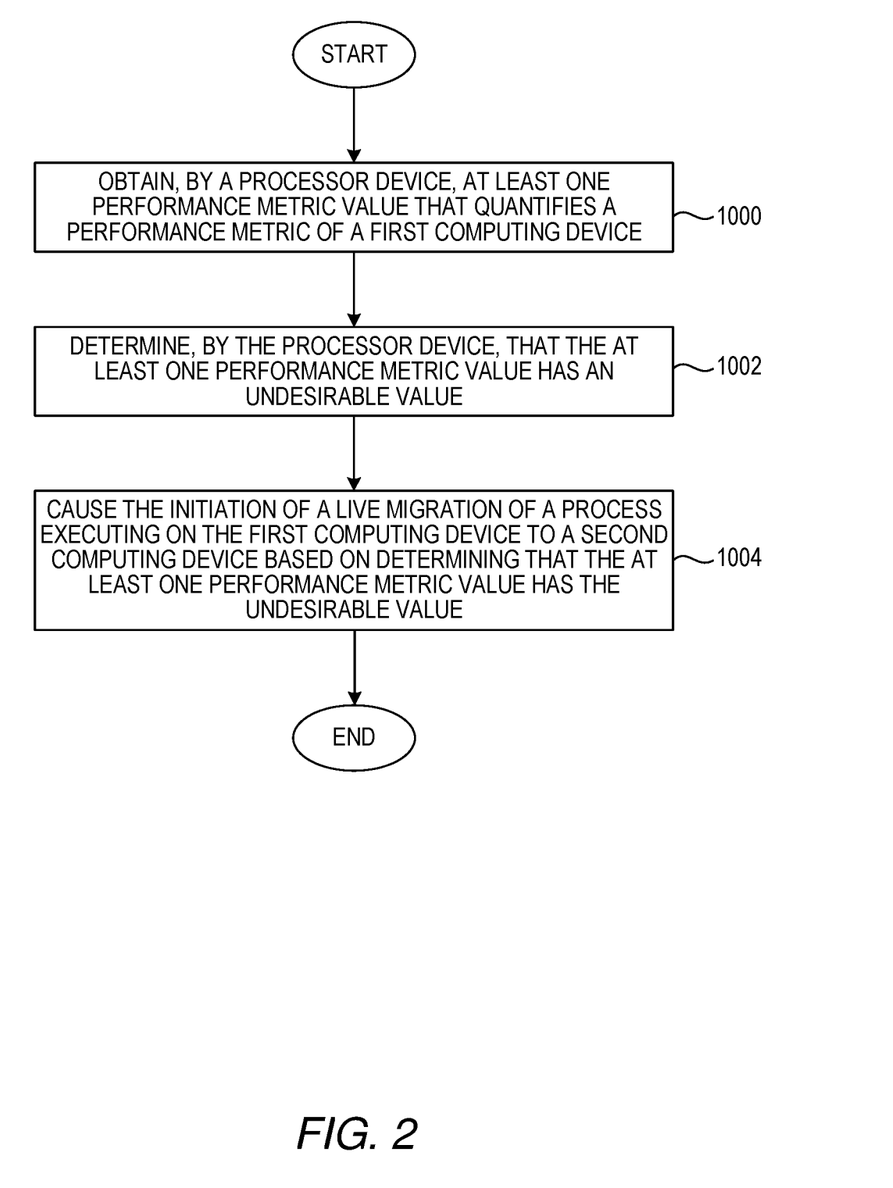
FIG. 2 is a flowchart of a method for process migration in response to real-time performance-based metrics according to one example.

FIG. 2 is a flowchart of a method for process migration in response to real-time performance-based metrics according to one example. FIG. 2 will be discussed in conjunction with FIG. 1. The performance monitor 68 obtains at least one performance metric value 46 that quantifies a performance metric of the computing device 12-1 (FIG. 2, block 1000). The performance monitor 68 determines that the at least one performance metric value 46 has an undesirable value (FIG. 2, block 1002). As discussed above, the at least one performance metric value 46 may be a single performance metric value 46 compared to a single threshold value, or may be a plurality of performance metric values 46 that are scored based on their respective values. The performance monitor 68 causes the initiation of a live migration of the process 26-1 executing on the computing device 12-1 to the computing device 12-2 based on determining that the at least one performance metric value 46 has the undesirable value (FIG. 2, block 1004). The performance monitor 68 may cause the initiation of the live migration directly by initiating the live migration, or by, for example, sending a message to the scheduler 70 identifying the source computing device 12 and the target computing device 12. The scheduler 70 then determines the soonest time a live migration of the process 26 from the source computing device 12 to the target computing device 12 can be initiated.

It is noted that, because the performance monitor 68 is a component of the computing device 60, functionality implemented by the performance monitor 68 may be attributed to the computing device 60 generally. Moreover, in examples where the performance monitor 68 comprises software instructions that program the processor device 62 to carry out functionality discussed herein, functionality implemented by the performance monitor 68 may be attributed herein to the processor device 62.

Figure 3:
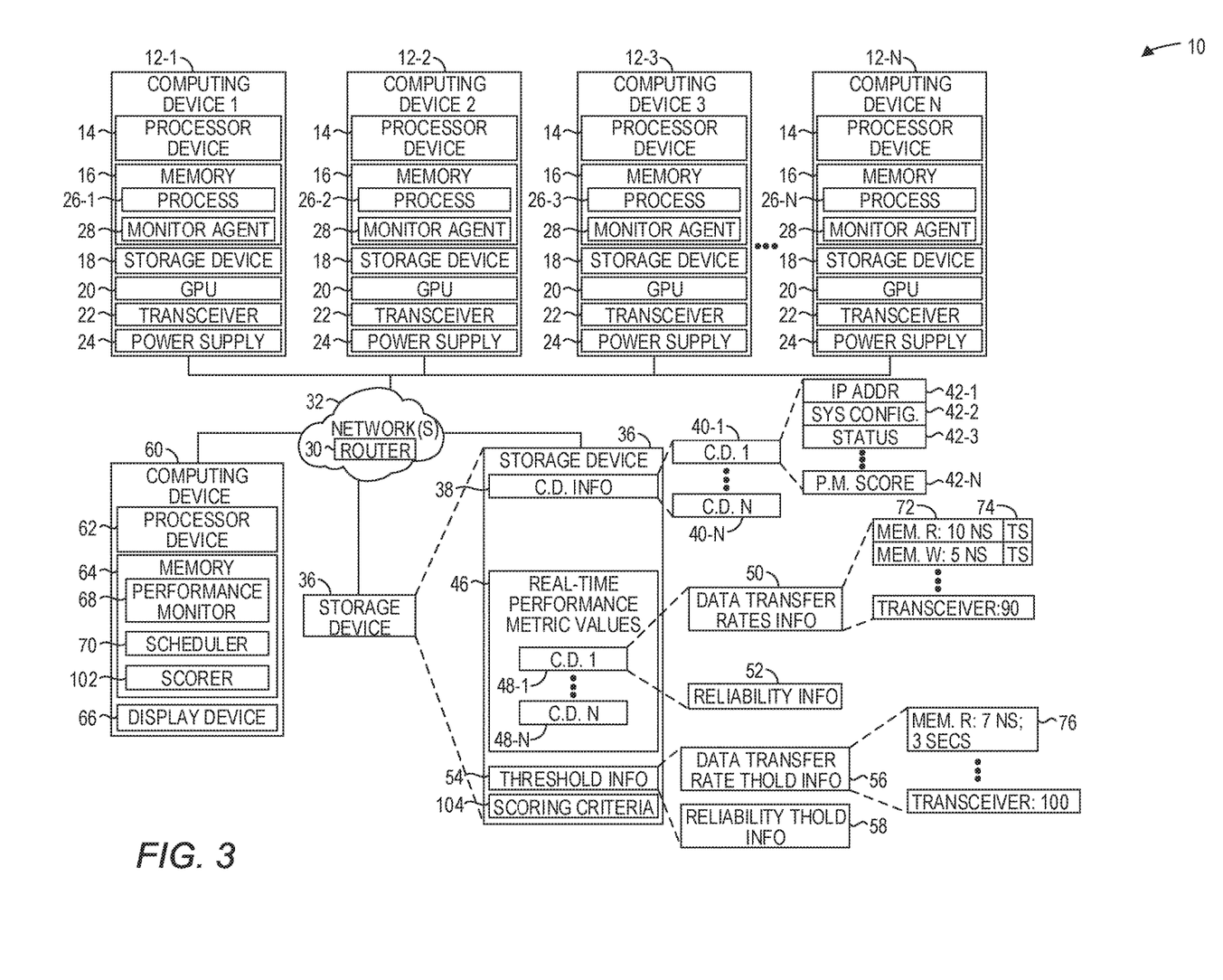
FIG. 3 is a block diagram of the system illustrated in FIG. 1, illustrating the use of a data transfer rate real-time performance metric value as a basis for initiating a live migration of a process according to one example.

FIG. 3 is a block diagram of the system 10 illustrating the use of a data transfer rate real-time performance metric value as a basis for initiating a live migration of a process according to one example. Assume for purposes of illustration that the monitor agent 28 of the computing device 12-1 periodically, such as each second, obtains performance metric values that include a read time value that identifies an amount of time between the time the processor device 14 of the computing device 12-1 requests data from the memory 16 of the computing device 12-1 and the time the processor device 14 receives the data. In this example, the memory read time is 10 nanoseconds. The monitor agent 28 sends the memory read time to the storage device 36, where it is stored in a memory read time field 72 of the data transfer rates information 50 of the record 48-1 that corresponds to the computing device 12-1. The monitor agent 28 may also send a timestamp in conjunction with the memory read time that identifies the time that the memory read time was measured. The timestamp may be stored in a timestamp field 74 of the data transfer rates information 50. Note that while only a single memory read time is illustrated in FIG. 3, the data transfer rates information 50 may maintain not only current performance metric values, but also performance metric values that were previously taken. In this manner, the performance monitor 68 may also determine that performance metric values for a component are deteriorating over time. A threshold value may indicate not only that a single performance metric value is undesirable, but that a certain rate of deterioration is also an undesirable performance metric value.

The performance monitor 68 continuously accesses the records 48-1-48-N and analyzes any new performance metric values contained in such records. The performance monitor 68 may, for example, use corresponding timestamps to determine whether the performance metric value has been previously obtained by the performance monitor 68. The performance monitor 68 accesses the memory read time field 72 of the data transfer rates information 50 of the record 48-1. The performance monitor 68 also accesses a memory read threshold value 76 identified in the data transfer rate threshold information 56 of the threshold information 54. The memory read threshold value 76 is 7. In this example, the value 7 identifies a maximum memory read threshold value, and any value over the maximum memory read threshold value is undesirable. The memory read time field 72 contains a value of 10, and thus the performance monitor 68 determines that the memory read time field 72 contains an undesirable value, and thus that the process 26-1 should be live migrated to another computing device 12.

The performance monitor 68 then selects another computing device 12 as a target computing device 12 to which the process 26-1 will be live migrated. Each of the computing devices 12-2-12-N may be potential target computing devices 12. In some examples, the performance monitor 68 may analyze the performance metric values contained in one or more of the records 48-2-48-N and select a particular computing device 12, such as the computing device 12-2 as the target computing device 12 based on the performance metric values contained in the records 48-2-48-N. In some implementations, the performance monitor 68 may utilize additional factors to select a target computing device 12, such as a current load of each of the computing devices 12-2-12-N. In particular, the performance monitor 68 may determine which of the computing devices 12-2-12-N has the least load based on some criteria, such as, by way of non-limiting example, processor usage, memory usage, and/or number of processes 26 executing on the computing devices 12-2-12-N. The performance monitor 68 may then access the record 48 that corresponds to such computing device 12, and if performance metric values are all desirable values, select such computing device 12 as the target computing device 12.

It should be noted that, in some implementations, the threshold information 54 may include not only an undesirable value, but a minimum length of time that the performance metric value must be undesirable. For example, the memory read threshold value 76 may be accompanied with a time, such as 3 seconds. The performance monitor 68 may then first ensure, such as via the timestamp fields 74 that contain the timestamps that have accompanied successive memory read times of the computing device 12-1, that the memory read time values have been undesirable values for more than three seconds prior to selecting a target computing device 12 and initiating a live migration of the process 26-1.

As will be discussed in greater detail below, it is again noted that, in some implementations the performance monitor 68 does not rely on a single undesirable performance metric value, but instead scores each computing device 12 based on multiple performance metric values, and based on such scores, may determine to initiate a live migration.

Figure 4:
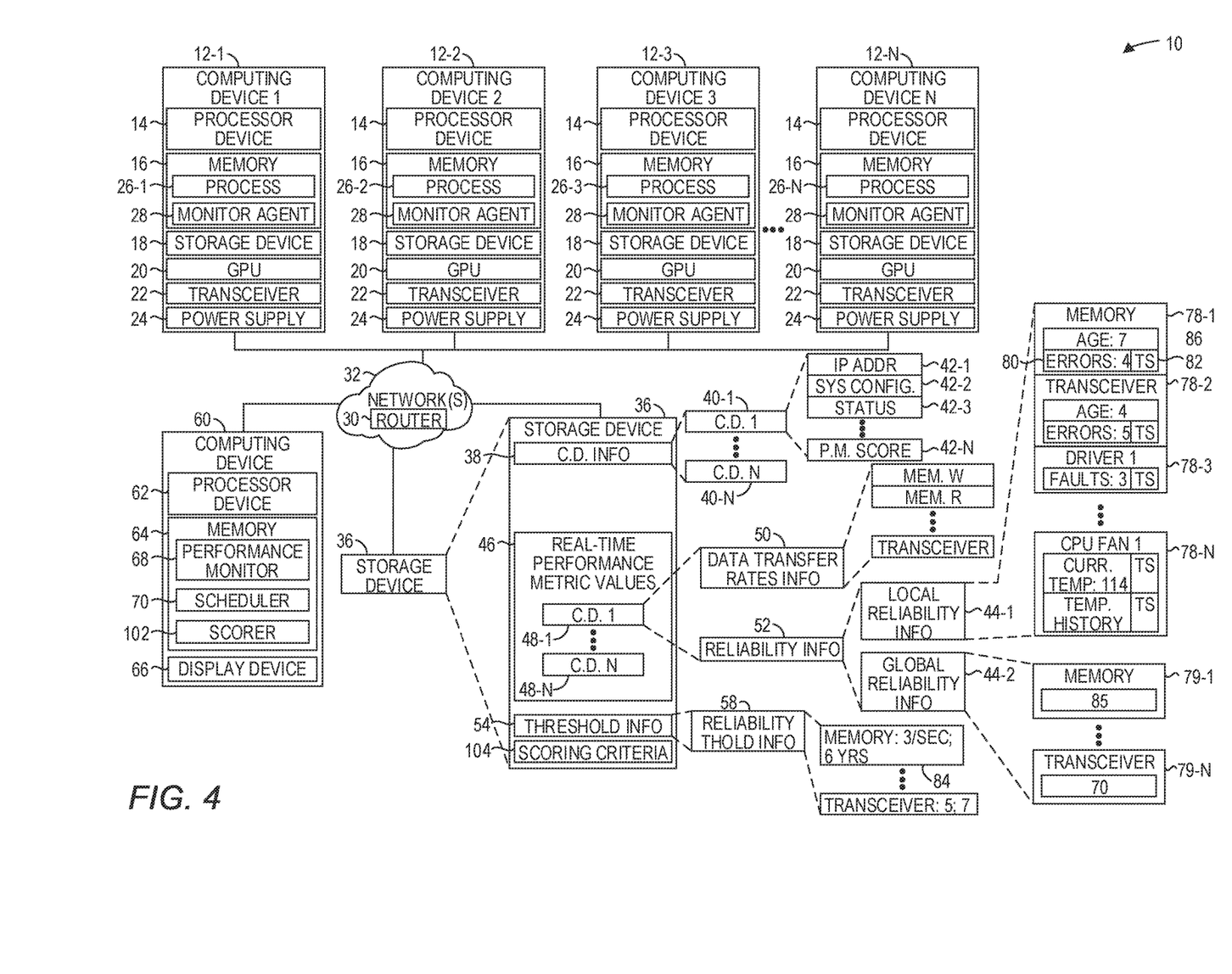
FIG. 4 is a block diagram of the system illustrated in FIG. 1, illustrating the use of reliability metric values as a basis for initiating a live migration of a process according to one example.

FIG. 4 is a block diagram of the system 10 illustrating the use of reliability metric values as a basis for initiating a live migration of a process according to one example. As an example, the reliability information 52, which corresponds to the computing device 12-1, includes the local reliability information 44-1 that corresponds to the computing device 12-1, and the global reliability information 44-2 that corresponds to the computing device 12-1. The local reliability information 44-1 includes a record 78-1 that identifies an age of the memory 16 of the computing device 12-1 and a fault, or error, count of errors encountered by the memory 16 over a period of time, such as seconds, minutes, or any other predetermined interval. A record 78-2 identifies an age of the transceiver 22 of the computing device 12-1 and a fault, or error, count of errors encountered by the transceiver 22 over a period of time, such as seconds, minutes, or any other predetermined interval. A record 78-3 identifies a number of faults encountered in a software driver of the computing device 12-1. A record 78-N identifies a current temperature of a CPU fan of the computing device 12-1 and a history of the number of temperatures of the CPU fan. While for purposes of illustration only four local reliability performance metric values are shown, the local reliability information 44-1 may include, by way of non-limiting example, an age of the electronic component, detected faults of software components, sensed characteristics of components, such as temperature, fan speed and the like, as well as historical sensed characteristics of the component.

The global reliability information 44-2 may comprise, for example, a record 79-1 that corresponds to the memory 16 of the computing device 12-1 and identifies a value based on the failure rate of all memories 16 in the entire population of computing devices 12. As an example, assume that there are 100 computing devices 12. At year 0, all memories 16 are in good working order, and thus the record 79-1 may contain a value of 100 (i.e., 100% of the memories are operating). After five years, assume that 10 memories 16 have failed. The value of the record 79-1 would now be 90 (i.e., 90% of the memories are operating). After ten years, assume that 50 memories 16 have failed. The value of the record 79-1 would now be 50 (i.e., 50% of the memories are operating). Upon some threshold value, such as 50, the performance monitor 68 may decide to initiate a live migration from the respective computing device. In this example, 85% of the memories 16 are still in operation. Similarly, a record 79-N corresponds to the transceiver 22 of the computing device 12-1 and indicates that 70% of all transceivers 22 are still in operation. It will be understood that these are merely examples of types of components for which failure rates may be maintained in the global reliability information 44-2, and that any other components, such as, by way of non-limiting example, processor devices, mother boards, particular components on the mother boards, power supplies, and the like may also be tracked.

Solely for purposes of illustration that the monitor agent 28 of the computing device 12-1 periodically, such as each second, obtains performance metric values that include an error rate of the memory 16 of the computing device 12-1 over some period of read time, such as seconds. In this example, the error rate is 4 per second. The monitor agent 28 sends the memory error rate to the storage device 36, where it is stored in a memory error rate field 80 of the record 78-1. The monitor agent 28 may also send a timestamp in conjunction with the memory error rate that identifies the time that the memory error rate was obtained. The timestamp may be saved in a timestamp field 82 of the record 78-1.

The performance monitor 68 continuously accesses the records 48-1-48-N and analyzes any new performance metric values contained in such records. The performance monitor 68 may, for example, use corresponding timestamps to determine whether the performance metric value has been previously obtained by the performance monitor 68. The performance monitor 68 accesses the record 78-1. The performance monitor 68 also accesses a memory error rate threshold value 84 identified in the reliability threshold information 58 of the threshold information 54. The memory error rate threshold value 84 is 3. In this example, the value 3 identifies a maximum memory error rate value per second, and any value over the maximum memory error rate value is undesirable. The memory error rate field 80 contains the value 4, and thus the performance monitor 68 determines that the memory error rate value in the memory error rate field 80 is an undesirable value, and thus that the process 26-1 should be live migrated to another computing device 12.

The performance monitor 68 then selects another computing device 12 as a target computing device 12 to which the process 26-1 will be live migrated, as discussed above with regard to FIG. 3. After selecting the target computing device 12, the performance monitor 68 initiates a live migration of the process 26-1 to the target computing device 12. In some examples, the performance monitor 68 may initiate the live migration via the scheduler 70.

In some implementations, the performance monitor 68 may use an age of the electronic component as a basis for live migration, either alone, or in conjunction with an error rate. For example, the memory error rate threshold value 84 may also be accompanied by a threshold age, which, in this example, is 3 years. The performance monitor 68 may utilize both criteria: the actual memory error rate and the age of the memory 16, prior to determining to live migrate the process 26-1 to the target computing device 12. In this example, the record 78-1 includes an age field 86, which identifies the age of the memory 16 as 7 years old. The performance monitor 68 determines that both criteria have undesirable values, because the age of 7 years is greater than the threshold age of 6, and the memory error rate of 4 is greater than the memory error rate threshold value 84 of 3.

It is noted that, similar to the discussion above with regard to FIG. 3, in some implementations, the memory error rate threshold value 84 may not only contain a threshold value, but also a number of successive occurrences by which the memory error rate threshold value 84 must be exceeded prior to the initiation of a live migration. For example, it may be required that the memory error rate threshold value 84 be exceeded for 5 successive occurrences.

In some implementations, the reliability threshold information 58 may contain a table that identifies a maximum per age of the electronic component. For example, for the memory 16, the reliability threshold information 58 may indicate that for a 1 year old memory 16, 2 errors per second is the threshold; for a 2 year old memory 16, 4 errors per second is the threshold; for a 3 year old memory 16, 6 errors per second is the threshold; and the like.

Figure 5:
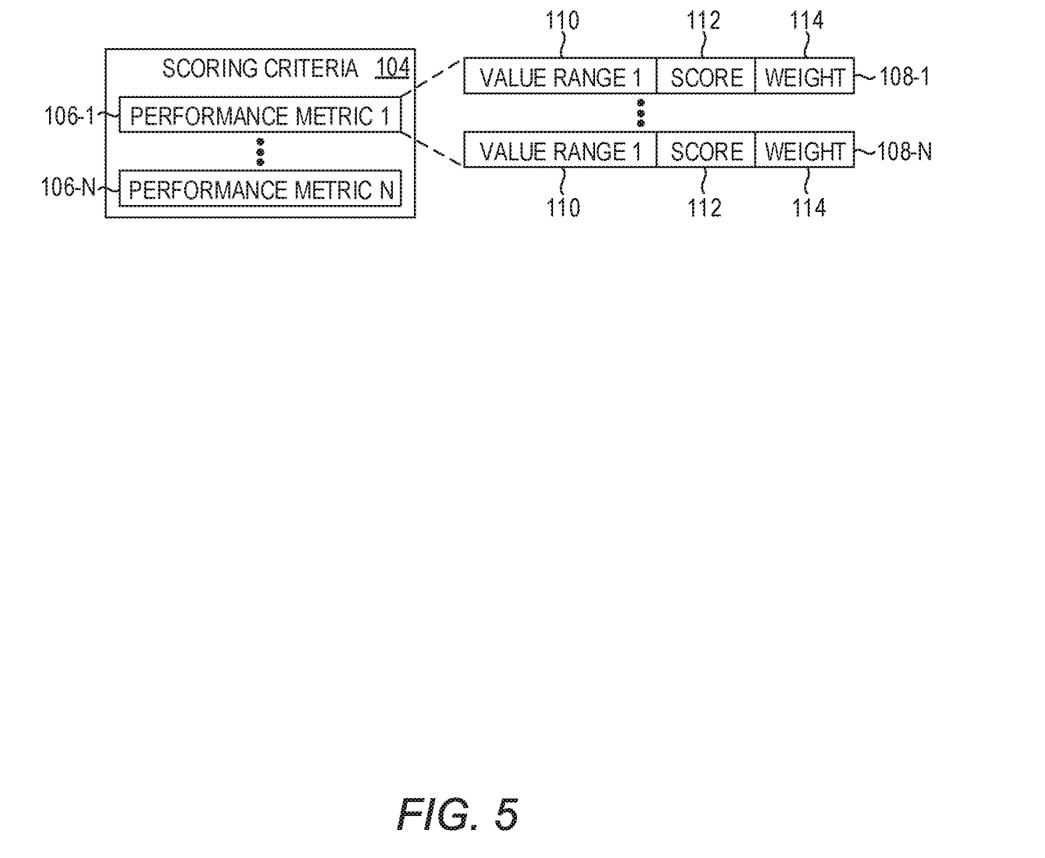
FIG. 5 is a block diagram illustrating scoring criteria according to one implementation.

FIG. 5 is a block diagram illustrating the scoring criteria 104 according to one implementation. The scoring criteria 104 contain a plurality of entries 106-1-106-N (generally, entries 106). Each entry 106 corresponds to a particular performance metric value 46. The entry 106 differs depending on the type of performance metric value 46. As an example, the entry 106-1 may correspond to a number of errors of a memory 16 over a certain period of time. The entry 106-1 comprises a plurality of different range entries 108-1-108-N of potential memory errors over the certain period of time. Each range entry 108 contains a potential range of errors field 110 that identifies a potential range of errors, a score field 112 that identifies a score associated with that particular range, and a weight field 114 that identifies a weight, or prioritization, to be given to that entry. As the number of errors increases, the weight may increase as well. Or, for more critical components, the weight may be higher than for other less critical components. The weight field 114 may contain a special predetermined value, such as 999, to indicate that a particular value for a particular component is so critical, that the live migration should be initiated irrespective of the scoring of any other component.

Generally, the scorer 102 utilizes the scoring criteria 104 to evaluate each performance metric gathered for each computing device 12, and to generate an overall score for the computing device 12. The overall score may be stored, for example, in the performance metric score 42-N for the corresponding computing device 12-1. The scorer 102 may score all the computing devices 12 on a periodic basis, in response to some event, upon operation request, or based on any other desired criteria. A particular score may result in, for example, an alert to an operator, and/or the automated initiation of a live migration. Upon determining that a live migration should occur, the performance monitor 68 may evaluate the scores of other computing devices 12 to identify an acceptable target computing device 12 to which the processes may be migrated.

Figure 6:
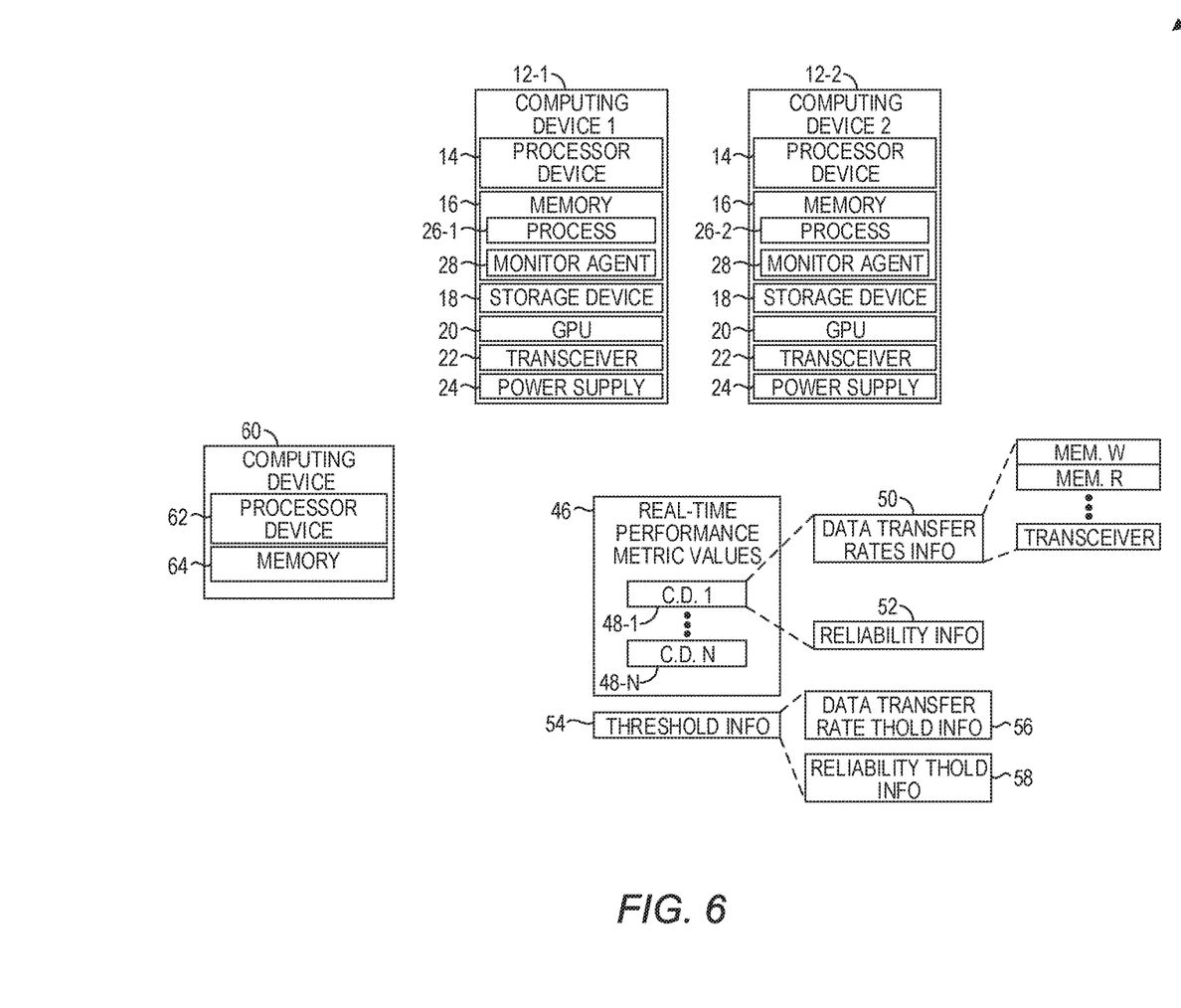
FIG. 6 is a simplified block diagram of the system illustrated in FIG. 1 according to one implementation.

FIG. 6 is a simplified block diagram of the system 10 illustrated in FIG. 1 according to one implementation. The system 10 includes the computing device 60, which in turn includes the memory 64 and the processor device 62 which is communicatively coupled to the memory 64. The processor device 62 is to obtain a performance metric value that quantifies a performance metric of the computing device 12-1. The processor device 62 is to determine that the performance metric value has an undesirable value, and cause the initiation of a live migration of the process 26-1 executing on the computing device 12-1 to the computing device 12-2 based on determining that the at least one performance metric value has the undesirable value.

Figure 7:
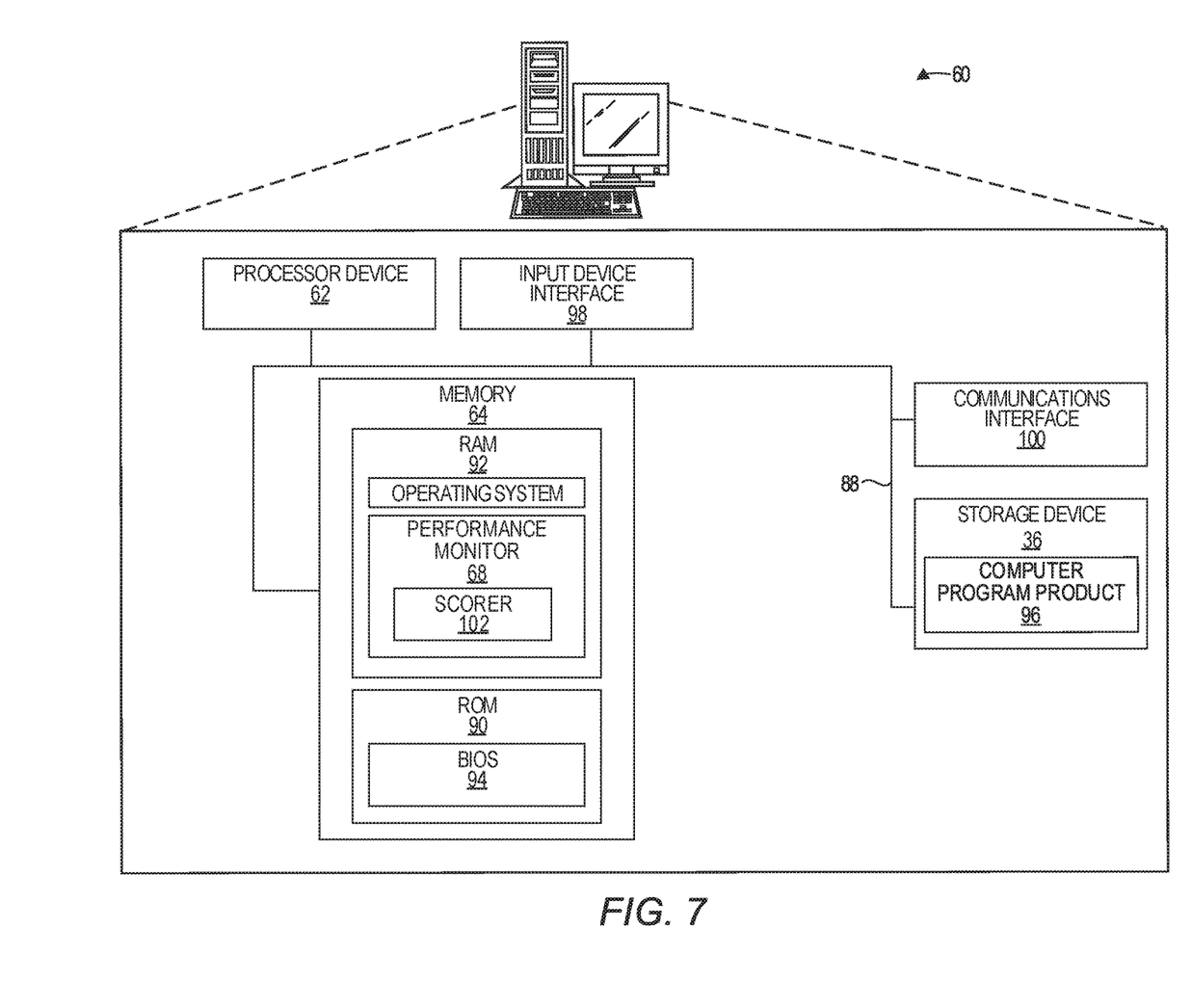
FIG. 7 is a block diagram of a computing device suitable for implementing examples according to one example.

FIG. 7 is a block diagram of the computing device 60 suitable for implementing examples according to one example. The computing device 60 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 60 includes the processor device 62, the system memory 64, and a system bus 88. The system bus 88 provides an interface for system components including, but not limited to, the system memory 64 and the processor device 62. The processor device 62 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The system memory 64 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between electronic components within the computing device 60. The volatile memory 92 may also include a high-speed RAM, such as static RAM, for caching data.

The computing device 60 may further include or be coupled to a non-transitory computer-readable storage medium such as the storage device 36, which may comprise, for example, hard disk drive (HDD) (e.g., enhanced integrated drive electronics (EIDE) or serial advanced technology attachment (SATA)), HDD (e.g., EIDE or SATA) for storage, flash memory, or the like. The storage device 36 and other drives associated with computer-readable media and computer-usable media may provide non-volatile storage of data, data structures, computer-executable instructions, and the like.

A number of modules can be stored in the storage device 36 and in the volatile memory 92, including an operating system and one or more program modules, such as the performance monitor 68, which may implement the functionality described herein in whole or in part. All or a portion of the examples may be implemented as a computer program product 96 stored on a transitory or non-transitory computer-usable or computer-readable storage medium, such as the storage device 36, which includes complex programming instructions, such as complex computer-readable program code, to cause the processor device 62 to carry out the steps described herein. Thus, the computer-readable program code can comprise software instructions for implementing the functionality of the examples described herein when executed on the processor device 62. The processor device 62, in conjunction with the performance monitor 68 in the volatile memory 92, may serve as a controller, or control system, for the computing device 60 that is to implement the functionality described herein.

An operator may also be able to enter one or more configuration commands through a keyboard, a pointing device such as a mouse (not illustrated), or a touch-sensitive surface such as the display device 66. Such input devices may be connected to the processor device 62 through an input device interface 98 that is coupled to the system bus 88 but can be connected by other interfaces such as a parallel port, an Institute of Electrical and Electronic Engineers (IEEE) 1394 serial port, a Universal Serial Bus (USB) port, an IR interface, and the like.

The computing device 60 may also include a communications interface 100, such as an Ethernet transceiver, suitable for communicating with the network 32 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   obtaining, by a processor device, at least one performance metric value that quantifies a performance metric of a first computing device;
   determining, by the processor device, that the at least one performance metric value has an undesirable value by:
      obtaining, by the processor device, a plurality of performance metric values that quantify corresponding performance metrics of the first computing device;
      accessing scoring criteria that identifies a score for each performance metric value of the plurality of performance metric values;
      generating a performance metric score for the first computing device based on the plurality of performance metric values and the scoring criteria;
      comparing the performance metric score of the first computing device to performance metric scores of other computing devices; and
      determining that the performance metric score is an undesirable score; and
   causing initiation of a live migration of a process executing on the first computing device to a second computing device based on determining that the at least one performance metric value has the undesirable value.

2. The method of claim 1 further comprising:
   subsequent to determining that the at least one performance metric value has the undesirable value and prior to causing the initiation of the live migration of the process, obtaining performance metric values that quantify performance metrics of the second computing device; and
   selecting, based at least in part on the performance metric values that quantify performance metrics of the second computing device, the second computing device for the live migration of the process executing on the first computing device.

3. The method of claim 1 wherein obtaining, by the processor device, the at least one performance metric value comprises:
   iteratively, over a period of time, obtaining a performance metric value that quantifies the performance metric of the first computing device, each performance metric value being based on a more recent measurement than an immediately preceding performance metric value; and
   for each iteration, comparing the performance metric value to a predetermined threshold value.

4. The method of claim 3 wherein the period of time is one second or less.

5. The method of claim 1 wherein the performance metric comprises a data transfer rate of data being communicated from a first electronic component to a second electronic component.

6. The method of claim 5 wherein the first electronic component comprises the first computing device and the second electronic component comprises a storage device.

7. The method of claim 5 wherein the first electronic component comprises a processor device of the first computing device and the second electronic component comprises a memory of the first computing device.

8. The method of claim 5 wherein the first electronic component comprises a network transceiver of the first computing device and the second electronic component comprises a router with which the first computing device communicates via the network transceiver.

9. The method of claim 5 wherein determining, by the processor device, that the at least one performance metric value that quantifies the performance metric of the first computing device has the undesirable value comprises:
   comparing the at least one performance metric value to a predetermined threshold value; and
   determining, based on comparing the at least one performance metric value to the predetermined threshold value, that the at least one performance metric value is the undesirable value.

10. The method of claim 1 wherein the at least one performance metric value comprises a value that quantifies a number of faults of an electronic component of the first computing device that have occurred over a period of time.

11. The method of claim 10 wherein determining, by the processor device, that the at least one performance metric value of the first computing device has the undesirable value comprises:
   determining an age of the electronic component;
   determining a predetermined threshold value that is based on the age of the electronic component;
   comparing the at least one performance metric value to the predetermined threshold value; and
   determining, based on comparing the at least one performance metric value to the predetermined threshold value, that the at least one performance metric value is the undesirable value.

12. The method of claim 1 wherein determining that the performance metric score is the undesirable score comprises comparing the performance metric score to a predetermined performance metric score.

13. A computing device, comprising:
   a memory; and
   a processor device coupled to the memory to:
      obtain at least one performance metric value that quantifies a performance metric of a first computing device;
      determine that the at least one performance metric value has an undesirable value by:
         obtaining, by the processor device, a plurality of performance metric values that quantify corresponding performance metrics of the first computing device:
         accessing scoring criteria that identifies a score for each performance metric value of the plurality of performance metric values;
         generating a performance metric score for the first computing device based on the plurality of performance metric values and the scoring criteria;
         comparing the performance metric score of the first computing device to performance metric scores of other computing devices; and
         determining that the performance metric score is an undesirable score; and
      cause initiation of a live migration of a process executing on the first computing device to a second computing device based on determining that the at least one performance metric value has the undesirable value.

14. The computing device of claim 13 wherein the processor device is further to:
   subsequent to determining that the at least one performance metric value has the undesirable value and prior to causing the initiation of the live migration of the process, obtain performance metric values that quantify performance metrics of the second computing device; and select, based at least in part on the performance metric values that quantify performance metrics of the second computing device, the second computing device for the live migration of the process executing on the first computing device.

15. The computing device of claim 13 wherein to obtain the at least one performance metric value, the processor device is further to:

iteratively, over a period of time, obtain a performance metric value that quantifies the performance metric of the first computing device, each performance metric value being based on a more recent measurement than an immediately preceding performance metric value; and for each iteration, compare the performance metric value to a predetermined threshold value.

16. A computer program product stored on a non-transitory computer-readable storage medium and including instructions to cause a processor device to:

obtain at least one performance metric value that quantifies a performance metric of a first computing device;

determine that the at least one performance metric value has an undesirable value by:

obtaining, by the processor device, a plurality of performance metric values that quantify corresponding performance metrics of the first computing device;

accessing scoring criteria that identifies a score for each performance metric value of the plurality of performance metric values;

generating a performance metric score for the first computing device based on the plurality of performance metric values and the scoring criteria;

comparing the performance metric score of the first computing device to performance metric scores of other computing devices; and determining that the performance metric score is an undesirable score; and cause initiation of a live migration of a process executing on the first computing device to a second computing device based on determining that the at least one performance metric value has the undesirable value.

17. The computer program product of claim 16 wherein the instructions further cause the processor device to:

subsequent to determining that the at least one performance metric value has the undesirable value and prior to causing the initiation of the live migration of the process, obtain performance metric values that quantify performance metrics of the second computing device; and select, based at least in part on the performance metric values that quantify performance metrics of the second computing device, the second computing device for the live migration of the process executing on the first computing device.

18. The computer program product of claim 16 wherein to obtain the at least one performance metric value, the instructions further cause the processor device to:

iteratively, over a period of time, obtain a performance metric value that quantifies the performance metric of the first computing device, each performance metric value being based on a more recent measurement than an immediately preceding performance metric value; and for each iteration, compare the performance metric value to a predetermined threshold value.

* * * * *